(Model.)
J. A. CAMPBELL.
NUT LOCK.
No. 310,985. Patented Jan. 20, 1885.
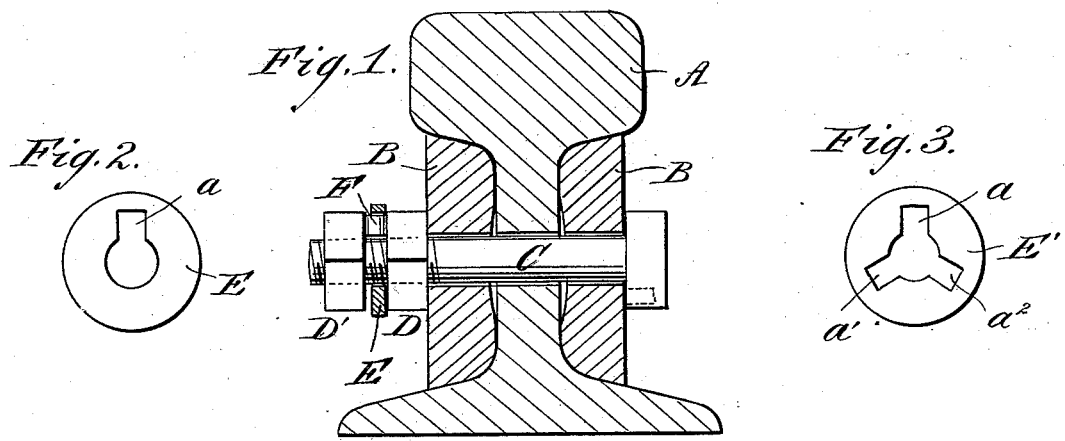
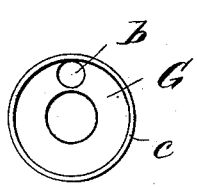
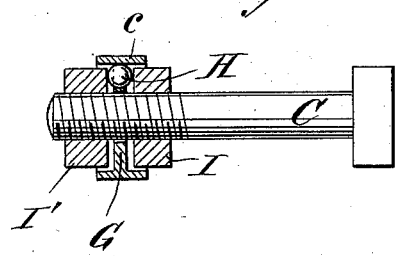
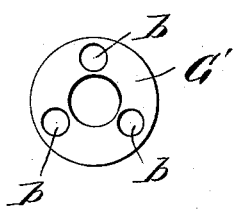
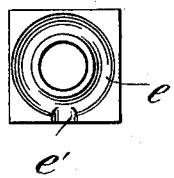
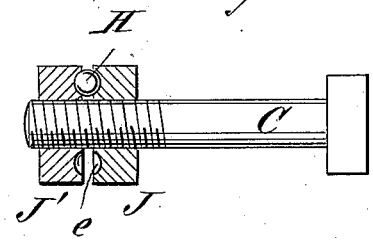
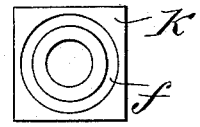
WITNESSES:
Dom Twitchell
C. Sedgwick
INVENTOR:
J. A. Campbell
BY Munn & Co.
ATTORNEYS.

UNITED STATES PATENT OFFICE.

JAMES A. CAMPBELL, OF BRENHAM, TEXAS.

NUT-LOCK.

SPECIFICATION forming part of Letters Patent No. 310,985, dated January 20, 1885.

Application filed April 30, 1884. (Model.)

*To all whom it may concern:*

Be it known that I, JAMES A. CAMPBELL, of Brenham, in the county of Washington and State of Texas, have invented a new and Improved Nut-Lock, of which the following is a full, clear, and exact description.

The object of this invention is to provide a reliable and easily-applied lock for the nuts of bolts, which can be used in any place where bolts are used.

The invention consists in a friction-roller held loosely between two nuts, or between a nut and any object to be held by a bolt, which roller, when the nut or lock-nut is screwed down upon it, binds the nut or nuts upon the bolt and locks them securely thereon, as will be hereinafter set forth.

Reference is to be had to the accompanying drawings, forming part of this specification, in which similar letters of reference indicate corresponding parts in all the figures.

Figure 1 is a cross-sectional elevation of a railroad-rail with fish-plates secured by bolt-tightening nut and lock-nut, according to my invention. Figs. 2 and 3 are plan views of washers to be used with a cylindrical friction-roller. Figs. 4 and 5 are plan views of washers to be used with spherical friction-rollers. Fig. 6 is a sectional view of two nuts locked upon a bolt, and showing a washer provided with an outside rim. Fig. 7 shows a modification in which a washer is dispensed with. Fig. 8 is a plan view of one of the nuts shown in Fig. 7, and showing a further modification. Fig. 9 is a plan and sectional view of a nut, showing another modification; and Fig. 10 shows different forms of friction-rollers.

A is a railroad-rail, B B the fish-plates, and C one of the fastening-bolts, as ordinarily in use.

Between the nut D and the lock-nut D' is placed upon the bolt C a washer, E, (shown in plan view in Fig. 2,) which washer is provided, adjoining the bolt-aperture, with a rectangular recess, $a$, adapted to receive a short cylindrical roller, F, which roller is of a slightly-greater diameter than the thickness of the washer E.

In Fig. 3 the washer E' is provided with three rectangular recesses, $a$ $a'$ $a^2$.

In Figs. 4 and 5 the washers G G' are provided with circular apertures $b$ between the bolt-aperture and the periphery of the washer, for receiving spherical rollers H.

In Fig. 6 is shown a bolt having a tightening-nut, I, and a lock-nut, I', between which is a washer, G, having a circular aperture for a spherical roller, H, which washer is provided with a rim, $c$, covering the space between the nuts I I'.

In Fig. 7 is shown a bolt having a tightening-nut, J, and a locking-nut, J', which nuts are provided each with an annular semicircular groove, $e$, for receiving and retaining the spherical roller H, and in Fig. 8 one of the nuts shown in Fig. 7 is shown provided with a short groove, $e'$, extending from the groove $e$ to the edge of the nut.

In Fig. 9 is shown a nut, K, provided with an annular groove, $f$, which groove is rectangular in cross-section, a pair of which nuts, when placed face to face, are adapted to receive the flat disk-like roller L, (shown in Fig. 10,) which disk may be made slightly convex upon one side and concave upon the other, to facilitate its movement in the grooves $f$.

It is evident that, instead of using a tightening-nut with a lock-nut, one nut only may be used, with the roller between the nut and the object to be secured by the bolt and nut.

The washers shown in Figs. 3 and 5 are intended to be used between the fish-plate or object to be secured and the tightening-nut, so that their rollers will prevent the fish-plate or other object from turning the nut by any movement that it may have imparted to it—such, for instance, as the up-and-down movement of a fish-plate caused by a passing train. They may be used with advantage in connection with the locking-roller.

It will be seen that in all the modifications of my nut-lock one and the same principle is made use of—namely, a friction-roller held between a nut and the object to be secured, or between a tightening-nut and a locking-nut, whereby when the nut is screwed home to place, the nut is slightly canted by the roller and bound upon the threads of the bolt.

When a spherical or disk-like roller is used without a washer and with but one nut, the face of the fish-plate B, or other object to be secured in place, is to be grooved to correspond with the nut. The rim $c$ (shown in Fig. 6) covers the spaces between the nuts and the washer, and prevents dirt, &c., from settling therein.

With the nuts J J', having the annular grooves $e$, a special tool may be needed to hold the roller between the nuts until caught by the said grooves; but by providing the grooves $e'$ (shown in Fig. 8) the nut $J'$ may be screwed nearly to place, and the roller then inserted through the groove $e'$.

This nut-lock is simple and sure in its operation, and is adapted for application upon bolts in any place where bolts are required, and can be varied in form as circumstances may require.

I do not limit myself to the particular forms of washers, rollers, or grooves shown, as the same may be varied within the scope of my invention.

Having thus described my invention, what I claim as new, and desire to secure by Letters Patent, is—

1. A nut-lock consisting of a friction-roller for canting the nut, held between a nut screwed upon a bolt and another nut on the surface of the object to be secured by the bolt, substantially as shown and described.

2. A nut-lock consisting of a friction-roller for canting the nut, held between a nut and another nut or the object to be secured by a bolt, and in an aperture in a washer between the said nuts, or between the nut and the object to be secured by the bolt, substantially as shown and described.

3. The combination, with a bolt and its nut or nuts, of a washer having an aperture, and of a friction-roller for canting the nut, having a slightly greater diameter than the thickness of the washer, substantially as shown and described, and for the purposes set forth.

JAMES A. CAMPBELL.

Witnesses:
THOS. B. BOTTS,
WM. AXER.